United States Patent Office 3,329,690
Patented July 4, 1967

3,329,690
PROCESS FOR THE MANUFACTURE OF SECONDARY AMINES WHICH COMPRISES REACTING AN N-SUBSTITUTED IMINO ESTER WITH A REACTIVELY ESTERIFIED LOWER ALKANOL AND HYDROLYZING THE RESULTING REACTION PRODUCT
Albert Eschenmoser, Zollikon, Zurich, Jakob Schreiber, Zurich, and Heinrich Peter, Neuallschwil, Switzerland, assignors to Ciba Corporation, New York, N.Y., a corporation of Delaware
No Drawing. Filed Jan. 3, 1966, Ser. No. 517,992
Claims priority, application Switzerland, Jan. 18, 1962, 600/62
3 Claims. (Cl. 260—347.7)

This is a continuation-in-part of our co-pending application Ser. No. 252,053, filed Jan. 17, 1963 and now abandoned.

The present invention provides a new process for the manufacture of secondary N-lower alkyl-amines.

It has been found that secondary lower alkyl amines are obtained by reacting an N-substituted iminoester with a reactively esterified lower alkanol and hydrolyzing the resulting reaction product. The reaction can be represented, for example, as follows:

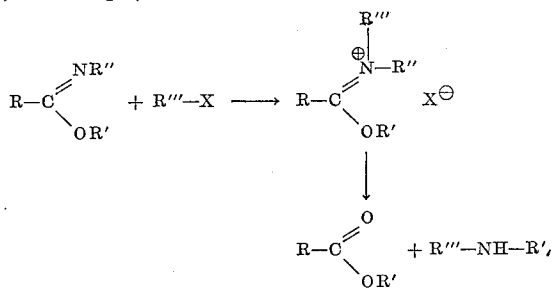

in which R represents a hydrogen atom or an organic radical; R' and R'' represent organic radicals, R''' the radical of a lower alkanol and X a reactively esterified hydroxyl group.

The process is substantially independent of the nature of the radicals R, R' and R'', the only condition being that these radicals do not contain quaternizable nitrogen atoms.

Since the N-substituted iminoester can readily be obtained from the corresponding primary amine H₂NR'', the new process is suitable for converting a primary amine H₂NR'' into its monoalkylation product HNR''R'''.

The reaction of the iminoester with the reactively esterified alkanol is performed in the usual manner, advantageously in the presence of a diluent such as a halogenated hydrocarbon, for example methylene chloride or chloroform, acetonitrile, ether, dioxane, tetrahydrofuran or similar substances. The hydrolysis is likewise carried out in conventional manner, under alkaline or acidic conditions, for example with a hydroxide, carbonate or bicarbonate of an alkali metal, or with a dilute acid especially a mineral acid such as hydrochloric or sulfuric acid, or an organic acid, such as acetic acid, or with an aqueous solution of an acid salt of a polybasic acid, for example with a citrate buffer solution.

The reactively esterified lower alkanols to be used in the reaction of the invention are methanol, ethanol, propanol, butanol or pentanol.

Particularly suitable reactive esters of the alcohols are those with strong inorganic or organic acids, preferably those of hydrohalic acids such as hydrochloric, hydrobromic or hydriodic acid, sulfuric acid or organic sulfonic acids, above all of arylsulfonic acids such as benzenesulfonic or toluenesulfonic acid.

The new method is quite generally applicable. It can be carried out with any desired N-substituted iminoester having no quaternizable nitrogen atom other than the imino nitrogen atom, for example iminoesters of aliphatic, alicyclic, aromatic or araliphatic or heterocyclic carboxylic acids. Examples of aliphatic acids are lower alkanoic acids, such as acetic acid, propionic acid, butyric acid; an example of an aromatic acid is benzoic acid; an example of an araliphatic acid is phenylacetic acid. In the above formula therefore R is especially lower alkyl, phenyl, or phenyl-lower alkyl, for example benzyl. The alcohol component of the iminoester is especially a lower alkanol, in which case in the above formula R' is lower alkyl. Preferably the iminoester is the intra-molecular iminoester of a hydroxy carboxylic acid, more especially of γ-hydroxybutyric acid, that is to say it has the structure

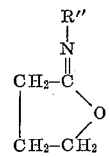

being an N-substituted imino-tetrahydrofuran.

The substituent R'' of the iminoesters is the residue which together with the NH₂ group forms a primary amine. The primary amine can be an aliphatic, cycloaliphatic, aromatic, araliphatic or heterocyclic primary amine; it is preferably an α-amino acid or a derivative thereof e.g. an ester or a peptide. In the above formula, R'' is for instance a lower alkyl radical, such as methyl, ethyl, propyl, tertiary butyl, or a cycloalkyl radical such as cyclopentyl or cyclohexyl, or a mono- or di-cyclo carboxylic aryl radical, such as unsubstituted or substituted phenyl or naphthyl, the substituents being for instance one or more members selected from the group consisting of halogen atoms, lower alkyl, lower alkoxy, lower alkoxy-carbonyl, the hydroxy group, the nitro group, or an unsubstituted phenyl-lower alkyl radical or a phenyl-lower alkyl radical substituted as indicated above, such as benzyl, β-phenylethyl, or a heterocyclic radical having at most 3 hetero atoms other than quaternizable nitrogen, especially a monocyclic 5–6 membered heterocyclyl radical having one hetero-atom, e.g. thienyl, piperidyl; preferably, R'' is the radical which, when attached to an amino group, represents a natural α-amino acid or an ester, e.g. lower alkanol ester, thereof. Such radicals are, for example, the radical of glycine or a glycine ester, of alanine or an alanine ester, of serine or a serine ester, more particularly of an aromatically or hetero-cyclically substituted natural α-amino acid, such as phenylalanine, tyrosine, histidine or tryptophane, or an ester thereof or a peptide built up from natural α-amino acids. The new method is used advantageously in cases where conventional methods yield secondary amines only with difficulty or not at all, and in such cases it is now possible to manufacture such amines by the present process.

This is also of value, for example, in peptide chemistry where the problem of the exchange of an acyl residue for an unsubstituted or substituted alkyl group is of importance. In this sphere the new process offers new possibilities: For example, a peptide containing an aliphatic acylamino group, of which the acyl radical contains a reactively esterified hydroxyl group, especially in position γ, can be subjected to intramolecular alkylation, with the carbamoyl oxygen atom reacting in the enol-form; in this manner imino-tetrahydrofurans are obtained. The reactive esters suitable for this reaction are above all those of hydrohalic acids, sulfuric acid or organic sulfonic acids such as arylsulfonic acids, for example toluenesulfonic acid. The cyclisation may be carried out at room temperature, or advantageously at an elevated temperature, possibly with the use of catalysts, especially silver salts such as silver tetrafluoborate, silver nitrate or silver perchlorate.

The resulting peptides, containing a cyclic iminoether grouping, can then be reacted with reactively esterified alcohols and hydrolysed according to the invention.

The iminoesters used as starting material are known or can be prepared in known manner or as described above. They may be used in the form of the free bases or of their salts. They may also be prepared in the course of the process and need not be isolated. The invention further includes any modifications of the present process in which an intermediate obtained at any one of its stages is used as starting material and the remaining step/steps is/are carried out, or in which the process is terminated at any stage thereof. It includes further the combination of processes for the manufacture of iminoesters with subsequent alkylation and/or hydrolysis as well as any new intermediate operation entailed in such a combination.

The following examples illustrate the invention:

Example 1

3.0 grams of α-cyclohexylimino-tetrahydrofuran are covered with 15 grams of methyl iodide, then diluted with 50 cc. of ether, and the mixture is kept for 14 hours at room temperature. The resulting methiodide is filtered off. Yield: 5.3 grams of crystals decomposing at 182–185° C.

These crystals are dissolved, without first having been purified, in 50 cc. of saturated sodium bicarbonate solution, diluted with 40 cc. of water, and the mixture is kept for 14 hours at room temperature; the solution is then adjusted with sodium hydroxide solution to pH=10 and extracted with ether. The ether is carefully distilled off, and the residue is distilled under atmospheric pressure, to yield N-methyl-cyclohexylamine boiling at 140 to 143° C. under 720 mm. Hg pressure. Specific gravity $n_D^{20}=1.4540$. The 3:5-dinitrobenzoate melts at 151–152° C.

The iminoether used as starting material can be prepared as follows:

2.734 grams (7.8 millimols) of the solid complex of silver fluoroborate with 2 mols of benzene,

are dissolved in 50 cc. of absolute methylene chloride, and the turbid solution is filtered. A solution of 1.580 grams (7.8 millimols) of γ-chloro-N-cyclohexyl butyramide in 20 cc. of absolute methylene chloride is stirred in dropwise at 0° C. with exclusion of moisture, whereupon silver chloride settles out spontaneously. The whole is stirred for 2 hours at 0° C., the silver chloride is suctioned off, the methylene chloride is partially evaporated and the solution is taken up in ether, whereupon the hydrofluoborate of the iminoether settles out. The iminoether is liberated from the salt by agitation with 2 N-sodium carbonate solution. The ether is washed three times with small amounts of saturated sodium chloride solution, dried with sodium sulfate and evaporated. Distillation under a high vacuum of the residue yields 2-cyclohexylimino-tetrahydrofuran boiling at 76° C. under 0.1 mm. Hg pressure. Specific gravity $n_D^{20}=1.4939$.

Example 2

287 mg. (1 millimol) of the N-tetrahydrofuranylidene-(2)-L-tryptophan methyl ester are dissolved in 10 cc. of absolute acetonitrile, mixed with excess methyl iodide (0.5 cc.) and the whole is left to itself for 70 hours at 20° C., then suction-filtered at 30° C. in a rotary evaporator to dryness, whereupon a yellowish foam is obtained.

10 cc. of 2 N-potassium bicarbonate solution are then added and the whole is stirred for 4 hours with a magnetic stirrer, whereupon the yellow solution soon loses its color. For working up the reaction mixture is taken up in methylene chloride and the reaction product is extracted with 2 N-hydrochloric acid. The acidic extracts are alkalinized with concentrated sodium carbonate solution and once more agitated with methylene chloride. The extracts are washed neutral with saturated sodium chloride solution, dried over anhydrous sodium sulfate and the solvent is evaporated at a low temperature. Yield: 197 mg. (84.5% of the theoretical) of a pale yellowish oil. The infra-red spectrum of the crude product contains bands of a secondary amine and of the N-methyl group.

The oil is dissolved in absolute ether and dry hydrogen chloride gas is injected. The precipitated hydrochloride is decolorized with active carbon and then recrystallized from methanol and absolute ether, to yield 211 mg. (78% of the theoretical) of N-methyltryptophanmethyl ester hydrochloride in the form of fine colorless needles melting at 170.5–172° C. The analytically pure product, obtained after 6 recrystallisations, melts at 171.5–172° C. (corrected). $[\alpha]_D^{23}=+47.2°$ (c.=2.03 in methanol).

The iminoether used as starting material can be prepared as follows:

(a) A solution of 5.20 grams (20.4 millimols) of L-tryptophan methyl ester hydrochloride in 50 cc. of methanol is mixed with 2.14 grams (21 millimols) of anhydrous triethylamine. The mixture is kept for 1 hour at room temperature and the methanol is then suctioned off in a rotary evaporator under mild conditions.

The free methyl ester is then taken up in methylene chloride and the insoluble triethylammonium chloride is filtered off. The solution is poured into a cylindrical vessel equipped with a vibro-mixer and cooled to −20° C. by means of a mixture of ice and common salt. 1.82 grams (23 millimols) of pyridine and 3.25 grams (23 millimols) of γ-chlorobutyryl chloride, each in 30 cc. of absolute methylene chloride, are then added dropwise. The reaction mixture is stirred overnight at −20 to −15° C. and then for 4 hours at room temperature.

For working up the methylene chloride phase is agitated with 3 portions each of ice-cold 2 N-sodium carbonate solution, 2 N-hydrochloric acid and distilled water, and dried over anhydrous sodium sulfate. The yellow solution of the crude product is decolorized with active carbon and then concentrated. On addition of hexane, γ-chlorobutyryl-L-tryptophan methyl ester crystallizes out in the form of fine, colorless needles forming spherical clusters. After the first three fractions (4.586 grams; melting at 113–113.5° C.) there are obtained two further fractions (0.846 gram; melting at 112–112.5° C.). Yield: 87.5% of the theoretical.

After two recrystallisations from methylene chloride+hexane there are obtained 5.54 grams of crystals (84.2% of the theoretical yield) which melt at 113–113.5° C. (corrected) as does the analyticaly pure product obtained from the first batch.

(b) A solution of 5.100 grams (15.78 millimols) of γ-chlorobutyryl-L-tryptophan methyl ester in about 200 cc. of absolute methylene chloride is cooled to −20° C. and then mixed with 62 cc. of 0.29 N-silver fluoborate solution (18.00 millimols). The whole is stirred for 1 hour at −20 to −15° C. and then allowed to react further for 1 hour at 0° C. and for 1½ hours at room temperature. The excess silver fluoborate in the reaction mixture is decomposed by adding 350 mg. of triethylammonium chloride and vibrating the mixture for 15 minutes.

The precipitated, slightly violetish silver chloride is filtered off and washed with 2 N-sodium carbonate solution and then with methylene chloride. The methylene chloride extracts are washed twice with 2 N-sodium carbonate solution and three times with saturated sodium chloride solution and then dried over sodium sulfate. The slightly turbid solution (finely dispersed silver chloride) is filtered through a column of Celite and the solvent is suctioned off at a low temperature.

Crystallization from methylene chloride+hexane gives a total yield of 4.51 grams of N-tetrahydrofuranylidene-(2)-L-tryptophan methyl ester in the form of crystalline needles (100%=4.52 grams). When the product is once more recrystallized from methylene chloride+hexane and dried in a high vacuum, there are obtained 3.84 grams of crystals melting at 171.5–172° C. and 0.530 gram of crystals melting at 171–172° C. (96.6%). The analytically pure product resulting from 4 recrystallizations melts at 171.5–172° C.; it contains from 0.15 to 0.18 mol of methylene chloride.

Example 3

2.64 grams of freshly prepared N-tetrahydrofuranylidene-(2)-L-tyrosine methyl ester are taken up in 160 cc. of absolute acetonitrile and 20.7 grams (146 millimols) of methyl iodide are added under nitrogen. The reaction mixture is stirred for 38 hours with a magnetic stirrer at room temperature under nitrogen, and the excess methyl iodide is suctioned off under vacuum. The acetonitrile which is thus withdrawn at the same time is replaced. The solution is mixed with 70 cc. of a saturated sodium bicarbonate solution and vibrated for 2 hours at room temperature, with the yellow solution immediately losing its color, and a voluminous white precipitate is formed. The bulk of acetonitrile is then suctioned off. The pH value of the batch is adjusted with 2 N-hydrochloric acid to 1–2, and any neutral material present is extracted with two small portions of ether. The initially yellow ether fractions turn dark-brown on standing.

The acidic, yellow solution is alkalinized with solid sodium carbonate until its color changes to reddish, and then extracted with 5× 100 cc. of chloroform. The combined chloroform extracts are washed neutral with two small portions of a saturated sodium chloride solution. After having dried the solution with sodium sulfate, the solvent is suctioned off, and there remain 1.890 grams (9.05 millimols) of a pale yellowish oil which turns crystalline after 2 hours. Yield: 82.7% of crude N-methyl-L-tyrosine methyl ester.

Hydrochloride.—M.P. 141–142° C.; $[\alpha]_D^{22} = +35.3°$ (c.=3.04 in methanol).

The iminoether used as starting material can be prepared as follows:

(a) A solution of 4.38 grams (18.9 millimols) of L-tyrosine methyl ester hydrochloride in 200 cc. of methanol is neutralized with 2.407 grams (23.8 millimols) of triethylamine, whereupon the solvent and excess triethylamine are expelled under vacuum. The white residue is taken up in 300 ml. of absolute methylene chloride and the mixture is cooled with a mixture of ice and common salt while being scavenged with nitrogen. A solution of 2.830 grams (20.1 millimols) of γ-chloro-butyryl chloride in 30 cc. of ether is then slowly dropped in with vigorous vibration, 2.06 grams (20.4 millimols) of triethylamine in 30 cc. of ether are added, the cooling is removed and the solution is further vibrated overnight.

The methylene chloride is suctioned off under vacuum and the oily residue is taken up in ether. On addition of a small amount of 2 N-hydrochloric acid two clear phases are formed. The ethereal phase is agitated with 3 portions totalling 100 cc. of ice cold 2 N-hydrochloric acid and 3 portions totalling 50 cc. of 2 N-potassium carbonate solution and washed with four small portions of an ice-cold saturated sodium chloride solution until neutral. After drying over sodium sulfate the ether is suctioned off under vacuum. The last remnants of water are removed azeotropically with addition of benzene. On drying for 18 hours in a high vacuum (10⁻³ mm. Hg) there are obtained 5.685 grams (18.9 millimols) of N-(γ-chlorobutyryl)-L-tyrosine methyl ester in the form of a slightly yellowish oil which after 24 hours reveals nuclei of crystallization. Yield of crude product: 100% of theory.

2.403 grams (8.01 millimols) of the oil are dissolved in a small amount of methylene chloride and hexane is added until turbidity sets in. The batch is then inoculated with crystals stemming from a previous batch, whereupon pale yellowish crystals separate which are decolorized with active carbon in methylene chloride. Another recrystallization furnishes 1.913 grams (6.39 millimols) of N-(γ-chlorobutyryl)-L-tyrosine methyl ester melting at 76–77° C. Yield: 79.7% of theory.

(b) 3.282 grams (10.9 millimols) of carefully dried N-(γ-chlorobutyryl)-L-tyrosine methyl ester are dissolved in 200 cc. of absolute methylene chloride and the solution is cooled with a mixture of ice and common salt. While vibrating the mixture vigorously, 20 cc. of an 0.626-molar (12.5 millimols) solution of silver tetrafluoborate are added dropwise under nitrogen. The mixture is further vibrated for 1 hour at −6° C. and then for 2 hours at room temperature. The excess silver tetrafluoborate is then decomposed by adding 0.503 gram (3.65 millimols) of triethyl ammonium chloride and vibrating the whole for 15 minutes. The precipitated silver chloride is filtered off and the methylene chloride solution is extracted with 2 portions, totalling 90 cc., of N-potassium bicarbonate solution with addition of ice and twice with small amounts of ice-cold saturated sodium chloride solution. The aqueous extracts are rinsed with two small portions of methylene chloride. The organic solutions are combined, dried over sodium sulfate and evaporated in a high vacuum at room temperature, to yield the N-tetrahydrofuranylidene-(2)-L-tyrosine methyl ester (2.640 grams) in the form of a bubbly, slightly yellowish oil. Yield of crude product: 91.5% of theory.

Example 4

6 millimols of N-tetrahydrofuranylidene-(2)-L-phenylalanine ethyl ester are methylated with methyl iodide as described in Example 2. The reaction mass is then hydrolysed at room temperature overnight with 50 ml. of 0.5 N-sodium bicarbonate solution. Working up in methylene chloride yields 1.092 g. of N-methyl-L-phenylalanine ethyl ester as a practically colorless oil (yield: 87% of theory, calculated from γ-chlorobutyryl-phenylalanine ethyl ester).

0.875 g. of the crude N-methylaminoacid ester are dissolved in 150 ml. of absolute ether, and dry hydrogen chloride gas introduced into the solution. Fine white crystals precipitate immediately. They are filtered off, dried under reduced pressure, and weighed (0.990 g.).

After one recrystallization from a mixture of absolute alcohol and absolute ether, 0.920 g. of fine needles is obtained which melt at 129.3–129.8° C. The analytically pure product which has been dried under a high vacuum for three days (0.87 g.) melts at 129.6–129.8° C. From the mother liquor, 90 mg. of needles of melting point 130.3–130.8° C. are obtained.

Optical rotation in distilled water: $[\alpha]_D^{21.5} = +9.9°$ (c.=3.67).

The picrate of N-methyl-L-phenylalanine ethyl ester melts at 136° C. after being recrystallized twice from a mixture of chloroform and hexane.

The iminoether used as starting material can be prepared as follows:

(a) 95 ml. of ethanol in a cylindrical vessel of 200 ml. capacity are cooled to −10° C., and 6.8 ml. of thionyl chloride slowly added dropwise, the whole being vibrated. 12.45 g. of L-phenylalanine are introduced in portions into the mixture which is then stirred while being cooled for half an hour and at room temperature overnight. After that, it is heated at 70° C., for 3 hours, a clear solution being obtained in the course of half an hour.

The solvent is expelled completely under vacuum, the residue taken up in a small amount of absolute ethanol, and treated with absolute ether until turbidity persists. In two fractions, 16.2 g. (94%) of fine needles of L-phenylalanine ethyl ester hydrochloride of melting point 147–148.5° C. are obtained.

4.6 g. (20 millimols) of L-phenylalanine ethyl ester hydrochloride are suspended in 130 ml. of absolute dioxane. While stirring and cooling with ice, 2.25 g. (22 millimols) of triethylamine in 20 ml. of ether are added dropwise. After stirring for 2½ hours, the precipitated triethylammonium chloride is filtered off and washed with ether. The filtrate is cooled with a mixture of ice and sodium chloride, and stirred vigorously while 3.1 g. (22 millimols) of γ-chlorobutyric acid chloride in 20 ml. of ether and then a solution of 2.15 g. (21 millimols) in 20 ml. of ether are dropped in. The reaction mixture is allowed to warm to room temperature and stirred overnight.

The solvent is carefully evaporated under reduced pressure and the residue taken up in ether and, while cooling with ice, the ethereal solution extracted three times with 2 N-hydrochloric acid and three times with N-sodium carbonate solution, and washed neutral with four portions of ice-water. The slightly brownish-yellow ethereal solution is decolorized with a little active carbon, dried over anhydrous sodium sulfate, and evaporated. A clear, very faintly yellowish oil remains behind which cannot be crystallized. Yield: 5.5 g. (92.5% of (γ-chlorobutyryl) - L - phenylalanine ethyl ester).

Optical rotation in absolute ethanol: $[\alpha]_D^{21} = -2.7°$ (c.=3.71).

1.80 g. (6.04 millimols) of oily (γ-chlorobutyryl)-phenylalanine ethyl ester are cyclized in methylene chloride with 27 ml. of 0.245 N-silverfluoborate solution (6.6 millimols) as described in Example 2, and the excess silver ions precipitated in the form of silver chloride with 140 mg. (1 millimol) of triethylammonium chloride. When the methylene chloride solution is washed with an ice-cooled 2 N-sodium carbonate solution and saturated sodium chloride solution, dried over sodium sulfate and the solvent evaporated, the free iminoether base is obtained.

*Example 5*

A solution of 3 g. of para-toluene-sulfonic acid methyl ester in 30 ml. of ether is added to 1 g. of N-β-phenyl-ethyl-phenylacetic acid-ethyliminoether, and the mixture allowed to stand at room temperature for 16 hours. The precipitate that has formed is filtered off and stirred overnight with 50 ml. of citrate buffer (pH 3.4). The mixture is made basic with sodium hydroxide solution, then saturated with sodium chloride, and extracted with 300 ml. of ether. After drying over sodium sulfate, the ether is distilled off in vacuo. The residue contains methyl-(β-phenylethyl)-amine which boils at 105° C. under a pressure of 20 mm. Hg.

The N-β-phenylethyl-phenylacetic acid - ethyliminoether used as starting material can be prepared as follows:

A solution of 1.245 g. of phenylacetic acid-β-phenyl-ethylamide in 10 ml. of methylene chloride is treated with 1.16 g. of triethyloxonium fluoborate. The reaction mixture is allowed to stand at room temperature for 3 hours, then poured into an ice-cold sodium bicarbonate solution, the mixture extracted with ether, the extract dried with sodium sulfate, and freed from solvent. The iminoether is obtained in the form of a colorless oil.

*Example 6*

2 g. of dimethylsulfate in 20 ml. of ether are added to a solution of 0.5 g. of 2-benzylimino-tetrahydrofuran in 10 ml. of acetonitrile and the whole allowed to stand at room temperature for 24 hours. The resulting precipitate is filtered off and stirred with 5% phosphoric acid for 6 hours. The batch is made alkaline with sodium hydroxide solution, the solution then saturated with sodium chloride, extracted with ether, the ethereal solution dried over sodium sulfate, and the solvent eliminated. Methylbenzylamine is obtained in the form of a colorless liquid which boils at 179–182° C. under a pressure of 720 mm. of Hg.

The iminoether used as starting material can be prepared by reacting 761 mg. of N-benzyl-γ-bromobutyric amide with 505 mg. of silver nitrate in acetonitride.

*Example 7*

A solution of 0.5 g. of N-cyclohexylacetic acid-ethyliminoether in 5 ml. of acetonitrile is allowed to stand at room temperature for 14 hours with 2.5 g. of ethyl bromide in 20 ml. of ether. The precipitate is then filtered off and stirred at room temperature for 8 hours with 20 ml. of 0.1 N-hydrochloric acid. The bath is then made alkaline with sodium hydroxide solution, the solution is saturated with sodium chloride and extracted with ether, and the ethereal solution dried over sodium sulfate, and the ether distilled off under reduced pressure. The residue contains the N-ethylcyclohexylamine which boils at 159–160° C. under a pressure of 720 mm. of Hg.

The iminoether used as starting material is obtained when 5 mmols of N-cyclohexyl-acetic amide and 7.5 mmols of triethyloxonium fluoborate are allowed to stand at room temperature for 5 hours in 20 ml. of methylene chloride, then extracted by agitation with concentrated potassium carbonate solution and the methylene chloride eliminated in vacuo.

*Example 8*

A solution of 3 g. of ethyl iodide in 20 ml. of ether is added to 0.5 g. of N-phenyl-acetiminoethyl ester and the whole allowed to stand at room temperature for 14 hours. The resulting quaternary salt is then isolated, and 20 ml. of 0.1 N-hydrochloric acid added, and the whole stirred at room temperature for 10 hours. The batch is rendered alkaline with sodium hydroxide solution, the solution saturated with sodium chloride, extracted with ether, dried over sodium sulfate, the solvent evaporated, and the residue distilled under reduced pressure.

N-ethyl-analine is obtained which boils at 83–85° C. under a pressure of 10 mm. of Hg.

The iminoether used as starting material can be prepared as follows:

5 mmols of N-phenylacetamide are allowed to react at room temperature for 5 hours with 7.5 mmols of triethyloxonium fluoborate in 20 ml. of methylene chloride. The batch is then extracted by agitation with concentrated potassium carbonate solution, the methylene chloride removed under reduced pressure, and the imino ester distilled. Boiling point: 88–90° C. under a pressure of 10 mm. of Hg.

By an analogous procedure, the following compounds can be prepared:

N-ethyl-para-aminophenol, melting at 100° C., from N-para-hydroxyphenyl-acetiminoethyl ester with ethyl iodide; N-ethyl-orthotoluidine, boiling at 214–216° C., from N-ortho-tolyl-acetiminoethyl ester with ethyliodide; N-methyl-para-anisidine, boiling at 135–136° C. under a pressure of 19 mm. of Hg, from N-para-methoxyphenyl-acetiminoethyl ester with methyl iodide;

N-methyl-2-amino-thiophene, boiling at 88–90° C. under a pressure of 15 mm. Hg, from N-thienyl-(2)-acetiminoethyl ester with methyl iodide;

N-ethyl-β-naphthylamine boiling at 180–182° C. under a pressure of 15 mm. Hg, from N-β-naphthyl-acetiminoethyl ester with ethyl iodide.

*Example 9*

1 g. of N-tetrahydrofuranylidene-n-amylamine is allowed to stand at room temperature for 16 hours with 5 g. of methyl iodide in 20 ml. of ether. The resulting precipitate is separated and dissolved in 50 ml. of saturated sodium bicarbonate solution. The solution is extracted with ether, dried with sodium sulfate, the ether removed, and the 1-methylamino-pentane distilled. Boiling point 110° C. under a pressure of 720 mm. of Hg.

The imino ester used as starting material is obtained by a procedure analogous to that described in Example 1, by treatment of N-amyl-γ-chlorobutyric amide with a solution of silver fluoborate-benzene complex in absolute methylene chloride.

What is claimed is:

1. A process for the manufacture of secondary amines of the formula $$H-N\begin{matrix}R''\\R'''\end{matrix}$$

in which R'' and R''' are as defined below, which comprises condensing an N-substituted iminoester of the formula $$R-C\begin{matrix}NR''\\OR'\end{matrix}$$

in which R is a member selected from the group consisting of hydrogen and hydrocarbon and R' is lower alkyl, or R and R' taken together with the imino carbon atom and the iminoester-oxygen atom are tetrahydrofuranyl, and R'' is an organic radical devoid of a quaternizable nitrogen atom, with a reactively esterified lower alkanol of the formula $$R'''-X$$

in which R''' is lower alkyl and X is the acyl residue of an acid selected from the group consisting of a hydrohalic acid, sulfuric acid and an organic sulfonic acid, to form a quaternary compound of the formula $$R-C\begin{matrix}\overset{\oplus}{N}R''\ X\ominus\\\ \ |\\\ \ R'''\\OR'\end{matrix}$$

and then hydrolysing said quaternary compound under alkaline or acidic conditions to obtain said secondary amine.

2. Process according to claim 1, wherein an N-substituted α-iminotetrahydrofuran is used as starting material.

3. Process according to claim 1, wherein the secondary lower alkylamine is an N-alkylated natural α-amino acid.

References Cited

Noller, Chemistry of Organic Compounds, Second Edition, pages 175, 248, 102–103 and 152 relied on.

Migrdichian, Organic Synthesis, volume I, page 403–404, 1957, QD 262M55.

WILLIAM H. SHORT, *Primary Examiner.*

SAMUEL H. BLECH, *Examiner.*

H. SCHAIN, *Assistant Examiner.*